Aug. 3, 1943.   A. H. SCHUTTE   2,326,071
CONTINUOUS FILTER
Filed Feb. 25, 1939   2 Sheets-Sheet 1
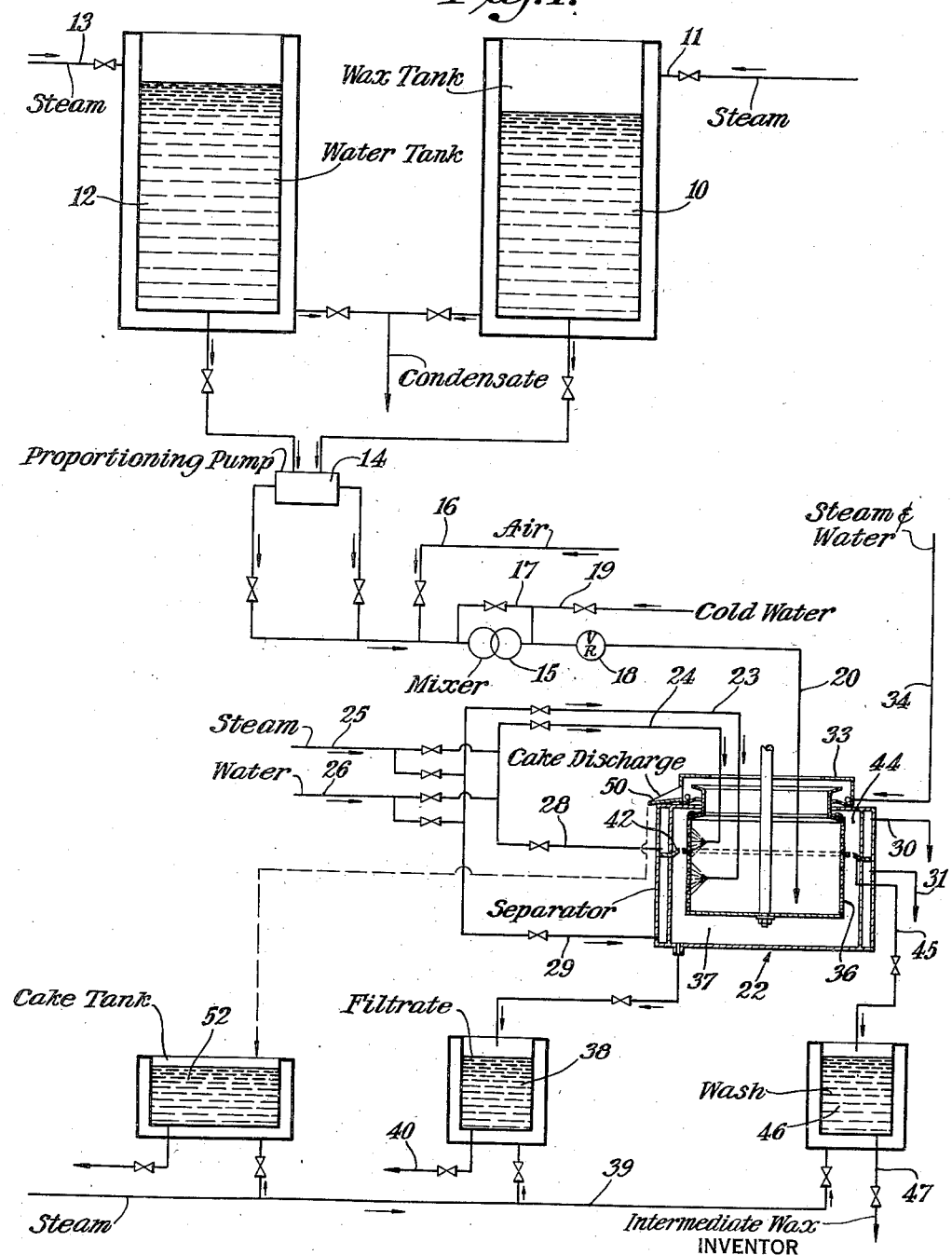

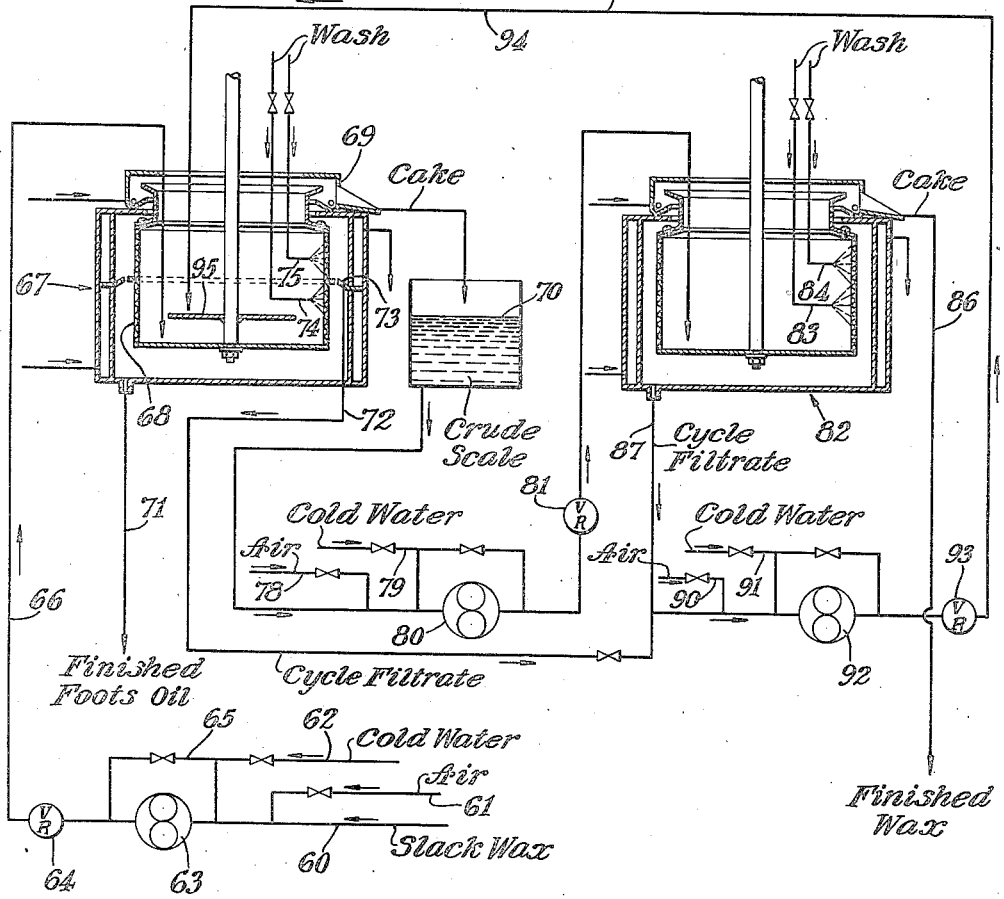

Patented Aug. 3, 1943

2,326,071

UNITED STATES PATENT OFFICE 2,326,071

CONTINUOUS FILTER

August Henry Schutte, Westfield, N. J.

Application February 25, 1939, Serial No. 258,527

1 Claim. (Cl. 210—63)

This invention relates to improvements in the method of and apparatus for continuously separating liquids from solids by centrifugal filtration and in one form of embodiment, is an improvement on the invention disclosed in my prior application, Serial Number 232,263, filed September 29, 1938, now U. S. Patent No. 2,168,306, patented August 1, 1939.

I have heretofore disclosed a method of separating wax from waxeous mixtures by the emulsification of the waxeous mixture with an immiscible and non-solvent material and thereafter cooling the emulsion to precipitate out certain portions of the wax, after which separation was accomplished in a suitable filter, preferably of the centrifugal type.

My present invention relates to an improvement on such invention and more particularly relates to the use of a continuous centrifugal filter by which the operation can be rendered continuous.

A general object of the invention is to provide a centrifugal filtering device which is adapted to discharge a filter cake autogenuously and continuously while filtration and washing are being carried out therein, and without the addition of moving parts to a machine of the conventional batch type.

A particular object of my invention is to provide a continuous centrifugal filtering operation to continuously filter emulsions of waxeous mixtures for the separation of various melting point constituents therefrom.

A still further object of the invention is to provide an improved method of centrifugally filtering and washing a slurry mixture of such density that additional slurry may be continuously introduced to one part of the filter and a cake may be continuously removed from another part of the filter without the necessity of any moving parts other than the rotor and without resort to scraping or propelling devices. In this device the cake removal is self-motivating.

Further objects and advantages of the invention will appear from the following disclosure of a preferred form of embodiment thereof taken in connection with the attached drawings which are illustrative thereof, and in which:

Figure 1 is a typical flow sheet for the wax treatment together with diagrammatic details of the centrifuge apparatus; and Figure 2 is a diagrammatic showing of a modified form of flow arrangement.

As more particularly described in my prior application, above referred to, the separation of different melting point waxes from a waxeous mixture may be carried out by forming an emulsion of the waxeous mixture with a non-solvent immiscible material, more particularly water. As shown in the drawings, the waxeous mixture is carried in a suitable jacketed tank 10 which is provided with a steam connection 11 for the purpose of maintaining the wax mixture at the desired temperature. The water or other non-solvent and immiscible liquid may be conveniently carried in a similar tank 12, which is jacketed to receive steam from the line 13. The wax and the water are formed into an emulsion in the correct proportions by being passed through the proportionating pump 14, and then being passed through a suitable type mixer 15, either with or without the addition of air or other inert gaseous material at 16. The mixer 15 is provided with a bypass 17 and normally pumps against a relief valve 18 so that an emulsion is made.

This emulsion is in the form of a foamy material which resembles in appearance whipped cream or shaving lather and which is sufficiently stable to permit the subsequent treatment. Temperature control is preferably obtained by indirect heat exchange or by the direct introduction of cold water as at 19, which is sufficient to solidify the higher melting point waxes in the emulsion. The emulsion is discharged at 20 into the separator generally indicated at 22.

The separator 22 is preferably a centrifugal basket type filter having a perforated rotating basket 36 lined on the interior with a foraminous filter medium. This is rotated at such a speed that a high separating or filtering force is obtained. With the particular wax treated as hereinafter described, it is convenient to make this filter medium of woven wire or filter duck, and it is possible to obtain a filtering force in the range of 500 to 1000 times gravity. As the filtering force is gravitational by nature, the entire cake is subjected to the force without an external crushing action, and the cake formed is a fine grained, free-filtering, porous mass, which is permeable to wash liquid. The cake is evenly dried and washing can be readily accomplished on this type of filter.

The wash liquid may be applied in either or both of two places as indicated, the wash lines 23 and 24 being suitably connected to steam and water lines 25 and 26 respectively, in such manner that accurate temperature control can be had.

The separator 22 is also preferably jacketed, with a heating medium introduced at 28 and 29, and with the medium taken off at 30 and 31. Steam and water may also be introduced around the cake removing channel 33 as by the line 34.

In the operation of the separator 22, a filtrate will be removed through the foraminous basket 36 and some of the filtrate collected in the lower chamber 37 of the separator. This filtrate may be collected in the filtrate tank 38, which is conveniently jacketed and heated as by line 39 so that the filtrate can be removed through the line 40.

If desired, a partition 42 may be used part way up the side wall of the filter basket 36, which tends to divide the filter into two sections, forming an upper filtrate compartment 44. The filtrate in this section may be removed through the line 45 and collected in the wash tank 46, which is similarly jacketed and heated from the line 39 so that the product may be removed at 47. In this case, however, the collected material may be an intermediate wax as will hereinafter be described.

Ordinarily a centrifugal filter of the type described has but a very limited capacity due to the volumetric limitations of the diameter, height and effective thickness of the cake. After a few minutes required to fill the machine, and a few minutes' operation for washing the cake, it is then necessary to remove the material as by an internal scraper. Thereafter operations are again resumed so that the effect is of a batch nature.

I have now found, however, that if I continue to introduce the emulsion of wax and immiscible non-solvent liquid, the cake builds up to a certain extent and because of the controlled nature of the cake, it will discharge over the top and can be collected in the trough 33, melted and removed from the machine at 50, such cake being carried into a cake tank 52. It is of course to be understood that if melting of the cake were undesirable, mechanical, hydraulic, or other means could be used for this cake removal.

This continuous discharge of cake out of the filter represents a new phenomenon not heretofore known to me, and appears to be due to the fact that the slurry introduced through the line 20, near the bottom of the separator 36, is heavier than the material that is discharged over the top. It is to be understood that the emulsion contains not only solidfied wax, but also a liquid wax and water. The liquid wax penetrates the foraminous filter basket and is removed. Similarly, a substantial part of the water of the emulsion as well as the wash water introduced at 23 and 24, is also discharged through the foraminous basket. The filter cake resulting, therefore, is of less specific gravity than the emulsion, because it is porous as a result of the emulsification. It is also semi-plastic so that it will tend to move upward due to the differential of forces acting in this direction. The lip on the basket 36 which controls the thickness of the cake does not prevent its discharge which is controlled solely by the rate of slurry feed as it is a direct volumetric displacement.

In experiments which I have conducted with a 109° F. melting point slack wax charge containing 30 to 35% oil, I have formed a 1½" cake on a centrifugal filter of 10" in diameter, which was operated at 1900 to 2300 R. P. M. From such machine, I have continuously collected in the trough 33, a wax of 122½° F. melting point containing 2 to 3% oil. Furthermore, I have found by introducing feed containing an insoluble dye, that the feed material penetrates the previously deposited wax cake at the bottom and pushes it up as an annular mass due to the reaction between a force which tends to prevent the cake moving, which is proportional to the density of the cake, and a force which tends to force the cake axially along the filter medium upwardly, which force is proportional to the density of the slurry feed. The resultant force is diminished by the wall friction along the filter medium and the lip. A cross section of the cake so formed shows that the new material takes a parabolic form with the axis vertical, and on the outer wall adjacent the foraminous lining. This shows the resultant of forces which continuously move the filter cake through the filtering zone, past the washing zone and eventually out into the trough 33.

I find that I can definitely control the upward movement of the filter cake and can so control the time factor that I can continuously filter at the equivalent rate of 1200 barrels per day of a slack wax of the above type in a filter 60" in diameter and 36" high. The rate of travel of the cake on such a machine is approximately 3.6" per minute.

It will be apparent that the continuous operation of such a device is a material improvement over the batch or semi-continuous process and, inasmuch as there are no moving parts except the basket itself, and as there is no scraper or other device which might tend to harm the rotating basket, I am able to obtain very successful yields with a very minimum of equipment, labor and upkeep. The conditions can be adjusted entirely externally of the apparatus so that the character of discharged material may be controlled. The intermediate wax drawn off at 47 is a result of this operation and such intermediate wax may be recycled if desired.

It will also be apparent that the invention can be carried out with any filter cake provided that the slurry is of a greater density than the resulting porous filter cake so that the slurry will displace the cake at a desired rate. The resultant of forces due to the differential of specific gravity of the slurry and cake must be sufficient to overcome the resistance to the motion of the cake.

This invention may be applied to the continuous filtration of sewage sludge, soybean and other vegetable oil extraction, fatty acid separation, cereal flour extraction, drying of chemical salts such as Glauber's salts, etc., extraction of starch and other operations in which the conditions are as specified.

A modified flow diagram for the recycling of intermediate wax is shown in Figure 2. In this arrangement, provision is made for recycling this intermediate wax cake removed from the first operation, and its reintroduction to a second filter at a predetermined point substantially adjacent a zone of similar quality of cake for a further filtration without contamination.

The filtrate from the second machine, instead of being mixed with the primary oily charge, with resulting oil solubility loss effect, is separately emulsified and fed to the primary machine at a point above the oily charge feed. This is analogous to feeding a fractionating tower above the stripping section and below the fractionating decks.

More particularly, the apparatus is adapted to treat slack wax for the purpose of separating desired melting point waxes. In this form of embodiment of the invention, the slack wax feed at 60 is conveniently mixed with air or other inert gas introduced at 61 and water introduced at 62, and is emulsified by mixer 63 which is conveniently a pump which, because of valve 64, recirculates the mixed materials through by-pass 65. The resulting emulsion is discharged at 66 to the first centrifugal filter generally indicated at 67.

The filter 67 is of the type heretofore described and is conveniently jacketed for desired temperature control. It is provided with the rotating filter cage 68 into the bottom of which the wax emulsion is introduced. The cake is continuously discharged by the autogenous displacement of the light cake by the relatively heavy slurry and is removed from the trough 69 and collected in crude scale tank 70. The finished foots oil is removed at 71. A cycle filtrate can be removed at 72 from the upper portion of the filter if the partition 73 is used. Washing of the filter cake at 74 and 75 is usually found desirable.

The crude scale wax collected at 70 is preferably treated again by re-emulsifying with inert gas or air at 78 and immiscible and non-solvent liquid or water at 79, by mixer 80 and the emulsion is discharged through valve 81 into the second filter generally referred to at 82. This is similarly jacketed to facilitate the temperature control and is provided with wash nozzles at 83 and 84.

In the second filter, the finished wax is removed as cake at 86 and the cycle filtrate is removed at 87. The temperature control and wash medium permit precise control of the quality of the final wax.

The cycle filtrates from the second filter at 87 and from the first filter at 72, are then combined and emulsified with an inert gas such as air at 90, and with a non-solvent and immiscible liquid such as water at 91, and passed through the mixing device 92 and the emulsion, which discharges through valve 93, is discharged into the first filter through line 94. In this case, however, this recycle emulsion is introduced at a point somewhat higher than the point of introduction of the slack wax emulsion. A disc 95 maintains this feed at the desired level.

As previously pointed out, the recycle emulsion, having been partially freed of foots oil in the first filtration, is not subject to oil solubility loss as it is above the point of initial feed and has substantially the same characteristics as the filter cake at such zone. Recycling not only adds to the complete separation of finished wax from foots oil, but when accomplished as here pointed out, there is no tendency to contaminate the foots oil and maximum yields, with a minimum of circulation, are possible.

As an example of the products which I have obtained on a two stage operation, I show the following: Feeding 110° F. melting point slack wax, the finished foots oil from the first machine is 85° to 90° F. melting point. The crude scale wax is about 124° F. to 126° F. melting point, and from this is produced a finished wax having the desired 133° F. to 133.5° F. melting point.

While I have shown a preferred form of embodiment of my invention, I am aware that modifications may be made thereto and I therefore desire a broad interpretation of my invention within the scope and spirit of the description herein and of the claim appended hereinafter.

I claim:

A continuous centrifugal filter having a housing, a rotating basket having a closed end wall and a foraminous filter wall in said housing, means to feed an emulsion to said basket adjacent the end wall thereof, means to rotate the basket to centrifugally discharge the liquid portion of the emulsion outwardly through the filter wall, said liquid discharge freely passing through the filter wall and the solid materials which form a porous cake on the filter wall, said cake progressively moving axially along the filter wall under the influence of continued feed of emulsion and becoming drier toward the point of discharge, said housing having independent compartments longitudinally spaced with respect to the movement of the filter cake, and at least one liquid collecting partition in said housing, means intermediate of the filter wall to wash the cake at spaced points along the path of movement of the filter cake, said partition separating the filtrates and their respective wash applications, said filter having a supplemental end wall inwardly spaced from the closed end of the basket, and means to feed a drier emulsion to said filter between said supplemental end wall and the point of cake discharge from said basket, said supplemental end wall distributing said drier emulsion to a part of the foraminous filter wall where the liquid quality of the cake thereon is approximately the same.

AUGUST HENRY SCHUTTE.